Sept. 10, 1968  W. T. LINDSAY, JR  3,401,094

WATER CONVERSION PROCESS AND APPARATUS

Filed April 21, 1966

WITNESSES:
Bernard R. Gregory
Lee P. Johns

INVENTOR
William T. Lindsay, Jr.
BY
Frederick Shapor
ATTORNEY

United States Patent Office 3,401,094
Patented Sept. 10, 1968

3,401,094
WATER CONVERSION PROCESS AND APPARATUS
William T. Lindsay, Jr., Hempfield Township, Irwin, Pa., assignor to Westinghouse Electric Corporation, Pittsburgh, Pa., a corporation of Pennsylvania
Filed Apr. 21, 1966, Ser. No. 544,170
5 Claims. (Cl. 203—7)

ABSTRACT OF THE DISCLOSURE

A procedure for removing scale-forming salt (calcium sulfate) in an evaporator system for recovering fresh water from mineral-containing water, whereby seed particles of the mineral to be removed are added to the mineral-containing water after which the water is heated to a predetermined temperature level and held in a passive condition for a sufficient time to enable the scale-forming salt in solution in the water to combine with the seed particles and precipitate out of the solution.

This invention relates to the production of fresh water from sea water, and more particularly it pertains to the control of calcium sulfate scale in sea water evaporators, which are usually called "sea water converters" and the process of so doing is "sea water conversion."

One deterrent to the overall efficiency of an evaporator for producing fresh water from sea water or other mineral-containing water is the formation of scale on tubes of an evaporator. Considerable reduction in the cost of fresh water produced from sea water is obtained from an increase in the maximum operating temperature of sea water evaporators and particularly flash evaporators. The maximum operating temperatures are determined by scale formation limits.

Of the three principal scale ingredients in sea water, calcium carbonate ($CaCO_3$), magnesium hydroxide [$Mg(OH)_2$], and calcium sulfate ($CaSO_4$), the first two are adequately controlled by degasification and adjustment of the pH as is well known in the art. Indeed, such methods of control have already led to spectacular efficiency improvements by raising the maximum temperatures in flash evaporators from 200° to 250° F. At some temperature above 200° F., in any event possibly at or about 300° F., depending upon the concentration factor, calcium sulfate scale will form on the inner surface of the evaporator tubes. This last type of scale is not sensitive to pH control in this temperature range. Unlike some of the other scale forming salts, calcium sulfate forms at these temperatures two solid phases, namely, anhydrite ($CaSO_4$) which is a stable phase and hemihydrate ($CaSO_4 \cdot \frac{1}{2}H_2O$) which is a metastable phase under these conditions. The calcium sulfate scale deposited on the tubes of flash evaporators operating at temperatures in this range is invariably the metastable hemihydrate. The less soluable anhydrite readily supersaturates to such an extent (because of difficulty in nucleation, low crystal growth rate, or both factors) that it is possible to operate evaporators in a region between the solubilities of the two phases without scaling the evaporator tubes.

Heretofore, however, a problem has been to control the concentration of calcium sulfate in the water to prevent the formation of the metastable hemihydrate which forms at lower concentrations with increasing temperature of operation of the evaporator. There are advantages of seeding as a method of controlling scaling by substances having retrograde solubility characteristics. These result in part from the large surface area provided by a seed slurry for growth of potential scale and in part from the requirement for a finite degree of supersaturation before scale can nucleate on an initially clean surface.

Associated with the foregoing have been such prior art problems as efficiently operating at higher maximum temperatures, consumption of chemicals in the other materials used in the seeding process, and extraordinary heat losses. Full utilization of the possible effectiveness of seeding has been prevented by the rather slow crystal growth rate of anhydrite seed crystals, which allows precipitation of only a small fraction of the potential calcium sulfate scale in the rather short time elapsing during transit of sea water through the evaporator tubes.

It has been found in accordance with this invention that the foregoing problems and difficulties may be overcome by the use of a seed equilibration process and apparatus which take advantage of the temperature differences between the solubility curves of anhydrite calcium sulfate and hemihydrate calcium sulfate to avoid the formation of the latter which causes scale formation on evaporator tubes even though the evaporator is operated at maximum temperature ranges.

Accordingly, it is a general object of this invention to provide a seed equilibration process and apparatus for controlling the formation of calcium sulfate scale on evaporator surfaces for conversion of sea water.

It is another object of this invention to provide a seed equilibration process which prevents the formation of the hemihydrate calcium sulfate which is metastable at higher temperatures.

It is another object of this invention to provide a seed equilibration apparatus which provides for a seed equilibration vessel where the preheated sea water is detained for a sufficient time in the presence of calcium sulfate seed nuclei to permit a high proportion of the calcium sulfate to precipitate out of solution.

Finally, it is an object of this invention to satisfy the foregoing problems and desiderata in a simple and effective manner.

Broadly, the invention comprises preliminarily heating sea water, or other water containing calcium sulfate in solution along with acid nuclei of calcium sulfate, at least to a temperature between the solubility curves of $CaSO_4$ and $CaSO_4 \cdot \frac{1}{2}H_2O$, whereby the water is supersaturated with respect to $CaSO_4$ but not $CaSO_4 \cdot \frac{1}{2}H_2O$, holding the solution for a relatively long period of time after each preliminary heating step until $CaSO_4$ precipitates on the seed nuclei, thereafter heating the water solution to a higher temperature above the $CaSO_4$ solubility curve but below the $CaSO_4 \cdot \frac{1}{2}H_2O$ curve, and evaporating pure water from the treated solution.

More specifically, the present invention involves a procedure for the removal of predetermined amounts of calcium sulfate from sea water, or other mineral containing water, including the steps of adding a predetermined amount of anhydrite ($CaSO_4$) seed nuclei into a volume of sea water, heating the sea water to a temperature range of about 300° to 350° F., holding the sea water relatively stationary at temperature for sufficient time to permit the $CaSO_4$ to precipitate out of solution onto the seed crystals, and thereafter heating the resulting sea water to a temperature range of about 350° to 400° F. to permit vaporization of salt-free water therefrom and without exceeding the hemihydrate $CaSO_4 \cdot \frac{1}{2}H_2O$ solubility limit.

For a better understanding of the invention, reference is made to the drawings, in which.

The concentration of calcium sulfate shown in FIGS. 1 and 3 and referred to subsequently are mean effective concentrations, defined in accord with the following expression:

$$C_{CaSO_4} = \sqrt{C_{Ca^{++}} \cdot C_{SO_4^=}}$$

where $C_{CaSO_4}$ is the mean effective concentration of calcium sulfate (pounds $CaSO_4/100$ pounds $H_2O$), $C_{Ca^{++}}$ is the concentration of calcium ions present in the water (pounds $Ca/100$ pounds $H_2O$) and $C_{SO_4^=}$ is the concentration of sulfate ions in the water (pounds $SO_4/100$ pounds $H_2O$). It is not necessary for the concentrations of calcium and sulfate ions to be equal for the process and the discussion to be valid, and, indeed, these two concentrations seldom are equal in natural waters or sea water.

Figure 1:
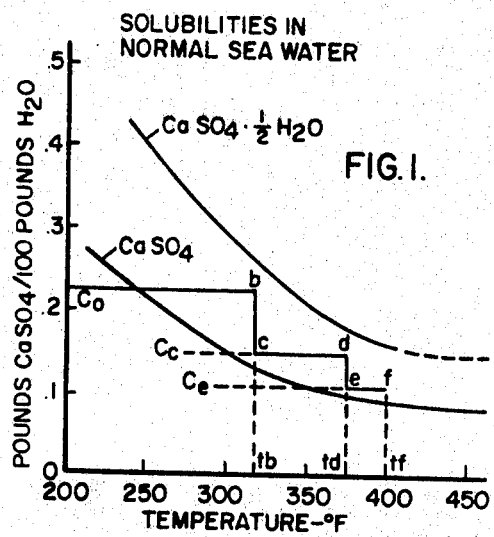
FIGURE 1 is a graph showing the calculated solubilities of anhydrite and hemihydrate calcium sulfate in normal sea water, and showing the steps of the process for treating fresh sea water which is not recycled, in accordance with the present invention.

The solubility characteristics of calcium sulfate in sea salt solutions corresponding to normal sea water above 200° F. are illustrated in FIG. 1. The exact positions of the two curves depend upon the total salt concentration but they retain approximately the same positions relative to one another throughout the range of sea water concentration factors of practical interest. As was indicated above, calcium sulfate has two solid phases including the stable anhydrite ($CaSO_4$) phase, and the metastable hemihydrate phase ($CaSO_4 \cdot \frac{1}{2}H_2O$). In FIGS. 1 and 3, the upper solubility curve represents the hemihydrate phase and the lower curves represent the anhydrite phases. Both solubility curves in FIG. 3 indicate higher solubilities because of enchancement of solubility of electrolytes by the increased ionic strength of the more concentrated solution, which is 1.5 times normal sea water in the case illustrated by FIG. 3.

Figure 3:
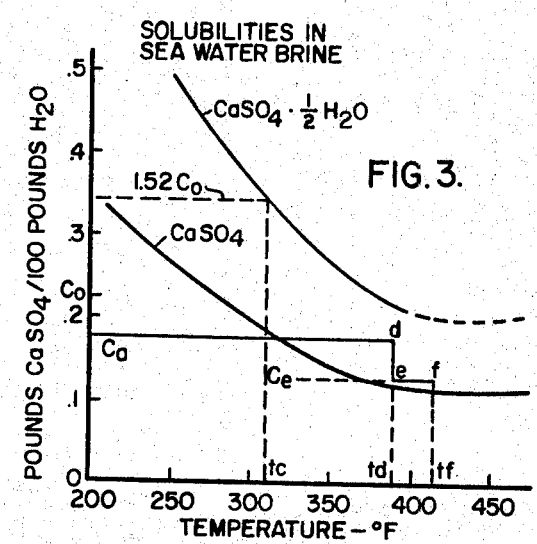
FIG. 3 is a graph showing the calculated solubilities of anhydrate and hemihydrate calcium sulfate in a 1.52 fold concentrate of that in normal sea water, and showing the process for treatment of sea water which is recycled in accordance with the present invention.

Although the anhydrite phase is less soluble than the hemihydrate phase, it readily supersaturates as indicated by the absence of anhydrite scale formation at conditions above and to the right of the lower curves in both FIGS. 1 and 3. Thus, the process of the present invention may be carried out at concentrations and temperatures below the upper hemihydrate curve and above the lower anhydrite curve.

In FIG. 1, fresh sea water having a mean effective concentration of 0.23% calcium sulfate $C_0$ may be heated to a temperature which is just below the saturation line of the hemihydrate such as at point $b$. The sea water which has been preliminarily seeded with nuclei of calcium sulfate is then held at said temperature, for example at 325° F., for a sufficient time for the attainment of thermodynamic equilibrium to such a degree to permit the calcium sulfate nuclei to grow into larger crystals which settle out of solution. The calcium sulfate concentration then is indicated at point $c$ in FIG. 1 and the water can then be heated additionally to a temperature which is just below the temperature of the saturation line of the hemihydrate curve such as at point $d$.

The sea water is then held at temperature with the anhydrite seed nuclei in solution while the solution approaches thermodynamic equilibrium with the seed, whereupon additional calcium sulfate precipitates out of solution to further reduce the calcium sulfate concentration in solution, such as at point $e$ in FIG. 1. Thereafter, the solution is additionally heated to a temperature in excess of 400° F. (such as point $f$) without incurring the formation of calcium sulfate scale on the heat exchange surfaces of the heating containers. Additional heating of the sea water above 400° F. is feasible because the right end portions of the solubility curves for the anhydrite and hemihydrate calcium sulfates extend substantially horizontally in spaced relation with respect to each other above that temperature zone.

Figure 2:
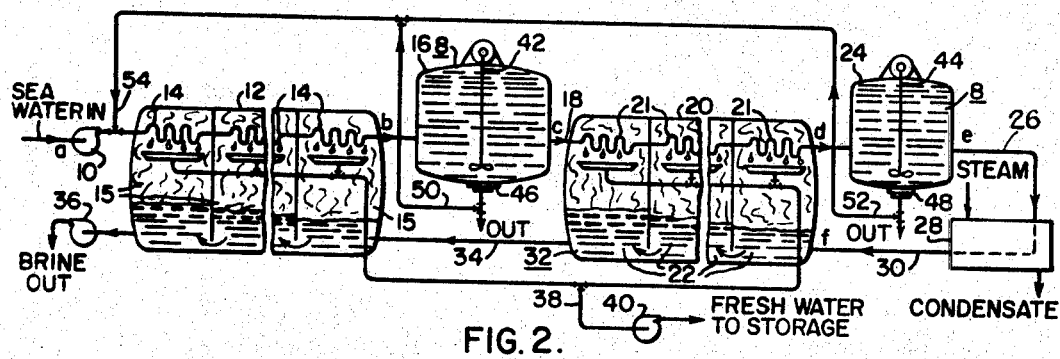
FIG. 2 is a schematic view for treating sea water in according with the process of FIG. 1.

The apparatus by which the foregoing process is performed is shown schematically in FIG. 2. At the left end of FIG. 2, fresh sea water having a mean effective calcium sulfate concentration of about 0.23% is pumped into the system through a pump 10 and into a sea water evaporator such as a flash evaporator 12 having at least two stages. The sea water is conducted through a heat exchange tube 14 through several stages 15 of the evaporator 12 from which it passes into a tank or vessel 16 where seed equilibration or thermodynamic equilibrium is approached. During the passage of the water through the evaporator 12, the water reaches the temperature indicated by the letter $b$ in FIG. 1, i.e., just below the solubility line of $CaSO_4 \cdot \frac{1}{2}H_2O$.

Within the tank or vessel 16 which is preferably insulated, the water is held in relatively passive condition while the calcium sulfate concentration falls from the initial level at $C_0$ to the level at $c$ in FIG. 1. The resulting water then passes from the vessel 16 through a conduit 18 to a plurality of serially connected heat exchanger tubes 21 in the evaporator portion 20 having a series of flash evaporator stages 22, whereby the water is further heated to a temperature indicated by the letter $d$ in FIG. 1. The evaporator portion 20 is preferably a second or higher temperature and pressure series of stages connected in series to the primary or lower stages of the evaporator 12. The water then enters a second tank 24 and is again held relatively constant for further precipitation of dissolved calcium sulfate from solution. The resulting water then flows by a conduit 26 to a top heater 28 for heating to its highest temperature before it undergoes evaporation.

As the water leaves the tank 24, it has a concentration generally indicated by the letter $e$ in FIG. 1. The water leaves the top heater 28 at a temperature indicated by the letter $f$ in FIG. 1 and is conducted through a conduit 30 into the portion 20, consisting of the series of flashing stages 22 wherein successive stages a portion of the water evaporates at successively lower temperatures and pressures in a conventional manner, and the resulting brine 32 flows via a conduit 34 to the lower stages 15 for further partial evaporation. At successively lower temperatures and pressures, the brine flashes into vapor in a conventional manner and is withdrawn from the system through a pump 36.

As shown in FIG. 2, the distillate or condensate is collected in each stage of the flash evaporators 12 and 20 and is withdrawn via a conduit system generally indicated at 38 through a pump 40 from where it is transmitted to a fresh water storage tank not shown.

The foregoing process and apparatus is used where sea water is processed through a "once-through" cycle wherein, after evaporation in the last stage, the remainder is discharged as brine and is generally returned to its source such as the ocean.

As shown in FIG. 2, each tank 16 and 24 is provided with an agitating means or stirrer 42 and 44. The first tank 16 is larger than the second tank 24 to allow longer residual time and is provided with the agitator 42 to promote rapid equilibration and also to fragment some of the larger crystals of calcium sulfate which form and settle in the bottom of the tank. The second tank 24 should not be stirred as vigorously so that larger crystals will settle to the bottom of the tank where they may be removed either continuously or intermittently. Thus, only the smaller particles or crystals of the calcium sulfate remain in suspension in the water and pass into the next series of stages. The volume of the equilibration tanks 16 and 24 must be sufficient to provide the holdup time necessary for the desired amount of calcium sulfate precipitation. Since the equilibration rate is slower at the lower temperatures, the tank 16 is larger than tank 24.

Both tanks 16 and 24 are provided with outlets 46 and 48, respectively, by which larger crystals of calcium sulfate are disposed of. However, small amounts of the crystalline slurry are withdrawn through pipes 50 and 52 and returned to the tube 14 at 54 for seeding the incoming fresh sea water 8.

An alternative procedure to the foregoing may be provided where some of the brine is recycled with predetermined amounts of fresh sea water. Where the brine is recycled with sea water, the mean effective concentration of calcium sulfate is less than 0.2% as indicated at $C_a$ in FIG. 3.

Figure 4:
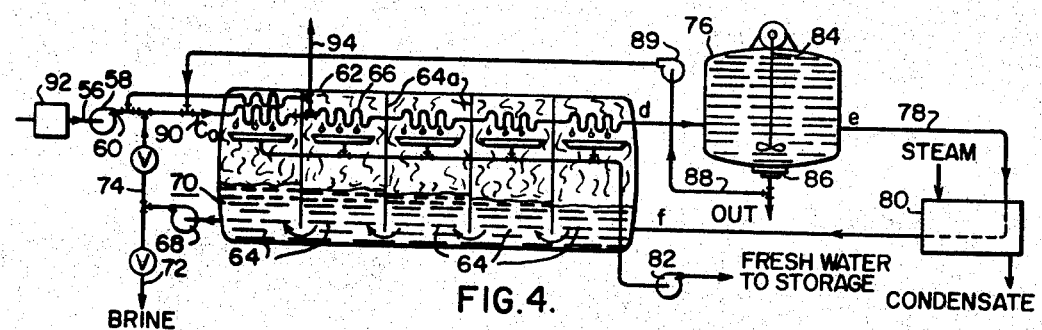
FIG. 4 is a schematic view showing the means by which the process of FIG. 3 may be achieved.

As shown in FIG. 4, fresh sea water enters through a conduit 56 via a water pressurizing pump 58 in a conduit 60 on its way to a multistage evaporator 62 having a plurality of flash evaporator stages 64 which are separated by vertical partitions 64a in a conventional manner. A brine pump 68 removes enriched brine 70 from the evaporator 62 to a discharge outlet 72. A portion of the brine is recycled through a conduit 74 to the conduit 60 where the brine and makeup sea water are blended to maintain the predetermined working level in the evaporator. Thus, the concentration ($C_a$) of calcium sulfate may be as low as 0.18% of the blended water entering the evaporator 62. A certain proportion of the sea water concentrate is regularly recycled through the system in order that the process may operate on water having a lower concentration of calcium sulfate and a higher concentration of other sea salts than normal sea water.

As a result of the recycling of the brine having the lower calcium sulfate concentration and the higher solubility of hemihydrate in the sea water concentrate, the overall procedure may be modified to eliminate one of the tanks as shown in FIG. 2. The incoming sea water 56 may be initially heated to a higher temperature such as at 375° F. as indicated at $d$ in FIG. 3. For that purpose, the flash evaporator 62 has a greater number of flash stages than the evaporator 12 (FIG. 2). As the heated sea water passes out of the evaporator 62, it is conducted into a tank or vessel 76 where the water is held relatively still at temperature in contact with anhydrite seed nuclei while the solution approaches equilibrium with the seed, thus reducing the dissolved calcium sulfate concentration to a lower value such as indicated by the letter $e$ in FIG. 3.

The water is then conducted through a conduit 78 and a top heater 80 and through the successive flashing stages of the evaporator 62 in a conventional manner. Fresh distilled water is withdrawn from the evaporator 62 and passed to storage through a pump 82.

The tank 76 is provided with an agitator 84 and with an outlet 86 from which a portion of the smaller crystal particles are returned by pump 89 through a conduit 88 to the sea water inlet conduit 60 at location 90. The incoming blend of fresh sea water 56 and brine 70 is seeded with particles of calcium sulfate in suspension which serve as a nuclei for larger crystal formation in tank 76.

FIGS. 3 and 4 illustrate the steady state operation of the process in a flash evaporator system with brine recycle. Assume the flow rate through the condenser tubes following the final or "heat rejection" stage, is F pounds of water per unit time. Normal sea water is added at the conduit 60 at a makeup rate of $\alpha F$. Additional normal sea water passed through separate tubes in the "heat rejection" stage and discharged through vent 94 does not need to be taken into account in this analysis. The concentration of calcium sulfate in normal sea water is $C_o$.

The calcium sulfate concentration is $C_a$ at the entry end of the evaporator 62 and is heated to temperature $t_d$ and is passed into tank 76, where the calcium sulfate concentration falls from $C_a$ to $C_e$. The solution is then additionally heated to a temperature $t_f$ and is then passed through the flash chambers of the evaporator 62. Fresh water distillate is produced at the rate of $\beta F$. The brine blowdown is removed through pump 68 at the rate of $\gamma F$. The recycle brine flow rate is $(1-\beta-\gamma)F$.

From a mass balance, the following relation obtains:

$$C_a/C_o = \alpha + (C_e/C_o)\left(1 - \frac{\gamma}{1-\beta}\right) \qquad (1)$$

In a typical system, the parameters might have the following values: $\alpha=0.275$; $\beta=0.115$; $\gamma=0.160$. Thus, $$C_a = 0.275 C_o + 0.819 C_e \qquad (2)$$

The brine concentration between points $C_a$ and $C_e$ will be greater than normal sea water by a factor of $\alpha(1-\beta)/\gamma = 1.52$. The solubility curves of FIG. 3 have been calculated for a brine of that concentration.

It is noted that the calcium sulfate solubilities are higher than that for normal sea water. That effect combined with the dilution of the calcium concentrate from $C_o$ to $C_a$ makes it possible to heat all the way to a temperature $t_d$ (about 385° F.) without scaling. Only one equilibration tank or vessel is necessary and this can be relatively small because of the smaller holdup times required at the higher temperatures. The optimum temperature for $t_d$ will have to be determined from calculations on equipment and operating costs using information derived from a study of relative kinetics of scale formation and seed equilibration.

It is noted that without seed equilibration, a brine recycle system with the parameters assumed above would begin to scale at the temperature $t_c$ (about 310° F.) as predicted from the solubility curves of the hemihydrate sulfate.

Moreover, although the evaporators 16, 24 and 62 are described as the flash type, they may be of any other kind where the equilibration of seed crystals with the solution is incomplete in the process as normally conducted unmodified by provision of the seed equilibrium apparatus.

Further, any salt (other than calcium sulfate) having an inverse solubility curve, i.e. decreasing solubility with higher temperature, and having a region of supersaturation above the equilibrium solubility limit may be treated in a manner similar to calcium sulfate.

The seed equilibration process has several advantages. First, flash evaporators using this process can be operated with higher maximum temperatures than was previously possible with resulting economies in saline water conversion. Second, no chemicals or other materials are consumed by the process. The seed is regenerated by precipitation of calcium sulfate from the sea water. Third, no additional energy is consumed by the process, other than the relatively small requirement for mixing. Heat losses from the equilibration vessels can be kept to a minimum by proper insulation. Fourth, the equipment required is of the simplest kind and can be made of the most inexpensive materials consistent with corrosion compatibility. Fifth, no modifications of the flow sheet are required that have effect on steam economy. Sixth, the process is particularly well adapted to flash evaporators operating with brine recycle.

It is understood that the present invention is concerned specifically with the problems associated with calcium sulfate in impure water, such as sea water, during conversion to pure water. For other purposes, the untreated incoming sea water may be preliminarily treated with suitable chemicals such as sulfuric acid and ferric chloride, in a conventional manner before evaporating to eliminate the formation of calcium carbonate and magnesium hydroxide scale which forms at relatively low evaporating temperatures. Such pretreatment has the further advantage of adjusting the pH to about 7 which results in reduction of corrosion. The foregoing pretreatment may be accomplished by providing a suitable receptacle 92 (FIG. 4) by which the sulfuric acid or suitable chemical additive is introduced into the conduit 56.

It is further understood that the multistage evaporator 62 may be provided with a vent line 94 by which a portion of the heated water is eliminated from the system to reject heat from the system for well known reasons. Similar members 92 and 94 may be added to the structure of FIG. 2.

Finally, the treatment cost of increment per unit of product is small and is determined primarily by the size of the equilibration vessel. With brine recycle, only one vessel is required, and this can be operated at a temperature sufficiently high that equilibration is rapid. At such a temperature, the principal requirement is that holdup time in the vessel be much greater than residence time in the higher temperature zones of the heat exchanger, say 100-to-1 at the most. This does not seem to require a vessel of excessive volume.

Although the foregoing is limited to sea water for descriptive purposes, it is understood that other types of water such as brackish or mine waste may be similarly treated. Moreover, the apparatus and method may be applied to water having a greater saline content than sea water.

It will be understood that the disclosure be construed as illustrative of the invention and not in limitation thereof.

What is claimed is:

1. Apparatus for removing a scale-forming salt in an evaporator system for recovering fresh water from mineral-containing water, including a multi-stage flash evaporator having condenser tubes divided into at least two pressure zones, the zone of lower pressure operating at a temperature up to about 325° F., means communicating with the condenser tubes for injecting seed particles of a mineral to be removed from the water, a top water heater, a salt precipitation tank between the pressure zones, a salt precipitation tank after the last zone and before the top water heater, and the said respective pressure zones comprised of a series of flash evaporator stages for evaporation of water at successively lower pressures and temperatures.

2. The apparatus of claim 1 wherein the injected seed particles are composed of calcium sulfate and the scale-forming salt is calcium sulfate.

3. The apparatus of claim 1 wherein a portion of the brine produced in the flash evaporator stages is recirculated and mixed with a predetermined amount of mineral-containing water.

4. A method for producing pure water by evaporation from a mineral-containing water having calcium sulfate present therein, including steps comprising:
  (a) introducing seed nuclei of calcium sulfate into the mineral-containing water,
  (b) heating the mineral-containing water through a temperature ranging from about 250° F. up to about 325° F.,
  (c) precipitating crystals of calcium sulfate out of the water,
  (d) heating the mineral-containing water through a temperature ranging from about 325° F. up to about 375° F.,
  (e) precipitating crystals of calcium sulfate out of the water,
  (f) finally heating the water through a temperature ranging from about 375° F. to a temperature in excess of 400° F., and
  (g) evaporating a portion of the heated mineral-containing water to produce a brine and vapors of pure water and condensing and collecting the condensate as pure water.

5. The method of claim 4 wherein a portion of the brine is recycled into the mineral-containing water at step (a).

References Cited

UNITED STATES PATENTS

| | | | |
|---|---|---|---|
| 1,399,845 | 12/1921 | Bull | 159—47 |
| 2,979,442 | 4/1961 | Badger | 203—7 |
| 3,111,462 | 11/1963 | Silver | 202—173 XR |
| 3,218,241 | 11/1965 | Checkovich | 203—7 |
| 3,249,517 | 5/1966 | Lockman | 202—159 |
| 3,320,137 | 5/1967 | Jebens et al. | 202—173 |

FOREIGN PATENTS 1,282,602  12/1961  France.

OTHER REFERENCES

Struthers Scientific and International Corp., Technical Review, Falling-Film Evaporation Process . . . , March 1965, pp. 6, 7 and 11 to 13.

NORMAN YUDKOFF, *Primary Examiner.*

D. EDWARDS, *Assistant Examiner.*